United States Patent [19]

Kawaguchi et al.

[11] Patent Number: 4,538,774

[45] Date of Patent: Sep. 3, 1985

[54] WEBBING TENSION DEVICE

[75] Inventors: Teruhiko Kawaguchi; Yuji Nishimura; Akinori Fujiwara, all of Niwa, Japan

[73] Assignee: Kabushiki Kaisha Tokai-Rika-Denki-Seisakushao, Aichi, Japan

[21] Appl. No.: 594,196

[22] Filed: Mar. 28, 1984

[30] Foreign Application Priority Data

Mar. 30, 1983 [JP] Japan .................. 58-46164[U]

[51] Int. Cl.³ .................. A62B 35/02; B65H 75/48
[52] U.S. Cl. .................. 242/107; 280/806
[58] Field of Search .......... 242/107, 107.4 R–107.4 E; 280/806; 297/478, 480

[56] References Cited

U.S. PATENT DOCUMENTS 4,447,017  5/1984  Inukai ................. 242/107.4 A
4,471,918  9/1984  Ando ................... 242/107

Primary Examiner—John M. Jillions

[57] ABSTRACT

In a webbing tension device adapted for use in a seatbelt system for protecting an occupant in an emergency situation of a vehicle, comprising a wheel supported by a webbing takeup shaft, a pawl latched to the wheel to prevent the wheel from rotating and trigger means detecting an acceleration and deceleration acting upon the vehicle in the emergency situation thereof to release the pawl from the wheel, cam means is caused to abut on the pawl and the trigger means. Accordingly, the wheel is surely prevented from the rotation in an ordinary running situation of the vehicle, and in the emergency situation of the vehicle the trigger means moves the cam means to release the pawl reliably from the wheel. In the present webbing tension device, thus, latching and releasing performances between the pawl and the wheel are improved.

16 Claims, 4 Drawing Figures

WEBBING TENSION DEVICE

BACKGROUND OF THE INVENTION

1. Field of the Invention

The present invention relates to a webbing tension device which imparts tension to an occupant restraining webbing during a vehicle emergency situation to restrain an occupant.

2. Description of the Prior Art

A seatbelt system for protecting the occupant in an emergency situation is constructed so that the webbing, one end portion thereof being retracted in layers into a webbing retractor, is fastened about the occupant and the occupant is restrained by the webbing during the emergency situation.

The webbing retracts retracting the webbing therein imparting a predetermined tension to the webbing. However, a retracting force of the webbing retractor is made relatively weak or it is completely removed, thereby forming a clearance between the occupant and the webbing fastened about the occupant so as not to press the occupant.

Accordingly, a tension device transmitting a biasing force of such resilient means as a coil spring to a webbing takeup shaft of the webbing retractor to impart a tension to the webbing in the emergency situation of the vehicle has been proposed in the conventional arts. In the tension device a pawl in the webbing retractor is latched to a wheel rotated together with the takeup shaft and receiving the biasing force and the pawl is separated from the wheel by a magnetic force of a solenoid in the emergency situation of the vehicle, whereby the biasing force received by the wheel is transmitted to the takeup shaft.

In the conventional tension device, also, the wheel is provided at its outer periphery with a cutout, a latching portion thereof being formed in a radial direction of the wheel, and a rotating force of the wheel due to the coil spring acts upon the pawl so as to press the pawl in a direction of a support member supporting the pawl, whereby the latching situation between the wheel and the pawl is maintained. Accordingly, a large force is required to release the pawl from the wheel in the emergency situation of the vehicle and, if the force acting upon the pawl is made weak, then there is such a fear that the latching situation between the pawl and the wheel is released due to vibrations or the like occurring in an ordinary running situation of the vehicle or at times of opening and closing of the doors of the vehicle.

SUMMARY OF THE INVENTION

In view of the above problems, the present invention has as its object the provision of a webbing tension device improved in latching and releasing performances between a pawl and a wheel, thereby preventing accidental actuation.

In the webbing tension device, the pawl placed in a latching situation to the wheel is caused to abut on the means, thereby to prevent the wheel from rotating in the ordinary course of operating the vehicle, and trigger means including an acceleration sensor and a trigger member moves the cam to reliably separate the pawl from the wheel in an emergency situation of the vehicle.

Description will hereinunder be given of an embodiment of the present invention with reference to the drawings.

PREFERRED EMBODIMENT OF THE INVENTION

Figure 1:
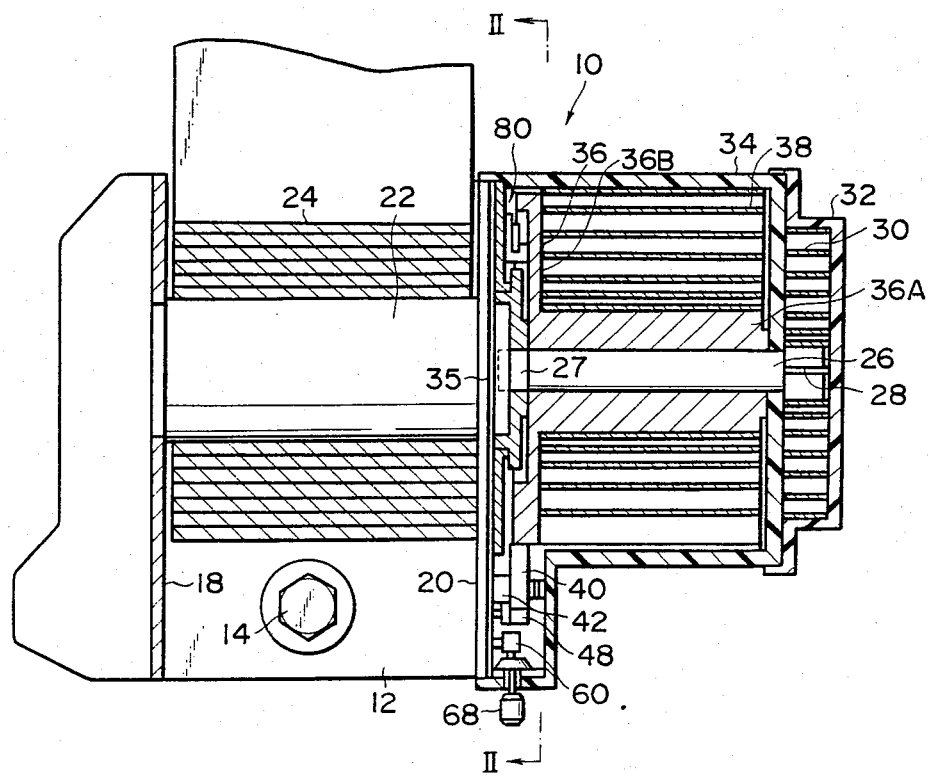
FIG. 1 is a sectional view of a webbing retractor, to which a webbing tension device according to the present invention is applied.

FIG. 1 shows a construction in which a webbing tension device according to the present invention is assembled integrally to a webbing retractor 10.

The webbing retractor 10 is fixed by its frame 12 to a vehicle body 16 through a bolt 14. A pair of leg plates 18 and 20 extend from both side portions of the frame 12 in parallel with each other and the leg plates 18 and 20 support a takeup shaft 22 rotatably. Secured to an intermediate portion of the takeup shaft 22 is one end portion of an occupant restraining webbing 24, the other end portion thereof being fixed to a tongue plate (not shown). The tongue plate is latched to a buckle device (not shown), so that an intermediate portion of the webbing 24 can be fastened about an occupant.

The construction described above is the same as that of a conventional device.

One end portion of the takeup shaft 22 elongated from the leg plate 20 is formed with a rectangular hole into which a rectangular protrusion 27 formed at one end portion of a rod 26 having a smaller diameter than the takeup shaft 22 is inserted, so that the rod 26 is fixed coaxially to the takeup shaft 22. The rod 26 is formed at the other end portion thereof with a slit 28, to which an inner end of a small coil spring 30, that is a resilient means is latched. The small coil spring 30 is housed in a small spring case 32 and an outer end thereof is latched to the small spring case 32. The small spring case 32 is fixed to the leg plate 20 through a large spring case 34 and a sheet 35 secured closely to the leg plate 20. Therefore, the small spring 30 weakly biases the takeup shaft 22 in a direction of a webbing retraction (in a direction of arrow A in FIGS. 2 and 4) to cause the takeup shaft 22 to retract the webbing 24 in layers thereon, whereby, when the webbing 24 is fastened on the occupant, the small spring 30 acts to cause the webbing 24 to press lightly against the occupant.

An outer periphery of the rod 26 supports a cylindrical portion 36A of a wheel 36 in a manner to allow rotation relative to the takeup shaft 22. Latched to the cylindrical portion 36A is the inner end of a large resilient coil spring 38 and the outer end of the large coil spring 38 is latched to the inner periphery of the large spring case 34.

The large coil spring 38 imparts to the wheel 36 a biasing force larger than the small coil spring 30. However, the wheel 36 is prevented from rotation in the direction of the webbing retraction by a pawl 40 in an ordinary running situation of the vehicle and only in an emergency situation of the vehicle is the wheel 36 rotatable in the direction of the webbing retraction.

Figure 2:
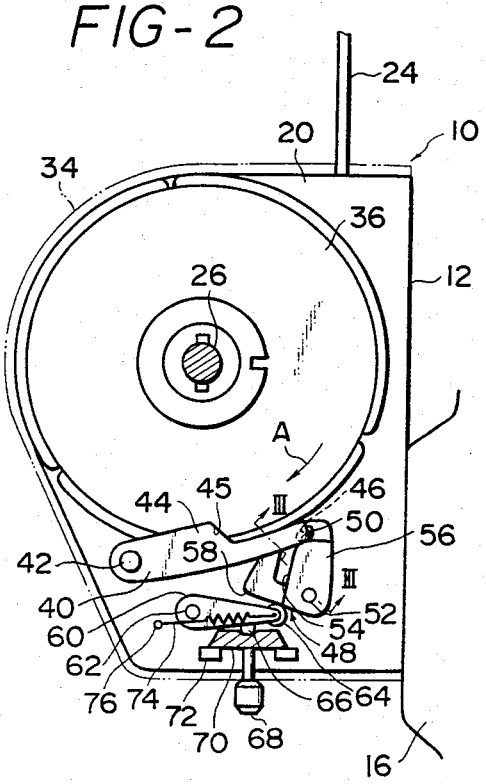
FIG. 2 is a sectional view taken along a line II—II in FIG. 1.

The pawl 40 is rotatably supported by a pin 42 fixed to the leg plate 20, as shown in FIG. 2, and it is formed at a side of the wheel 36 with a projection 44 latched to a recess 45 of the wheel 36. Also, the pawl 40 is provided at its forward end portion with a pin 46, which is received in an arc-shaped groove 50 formed on a plate cam 48 centering around a pin 52.

The plate cam 48 is supported rotatably by the leg plate 20 through the pin 52, and the arc-shaped groove 50 receives and stops the pin 46 of the pawl 40, so that a latching situation between the pawl 40 and the wheel 36 is maintained.

As the pawl 40 is subjected to clockwise force by the wheel 36, it biases the plate cam 48 to rotate in a counterclockwise direction, but the plate cam 48 is restricted from being rotated by a trigger lever 60. The arc-shaped groove 50 is formed on the plate cam 48 at a predetermined inclination angle so as not to rotate the plate cam 48 in a clockwise direction due to a component force of the pin 46 of the pawl 40. In addition, the embodiment may be constructed so as to be provided with a stopper pin drawn in by a solenoid during an emergency situation of the vehicle.

Figure 3:
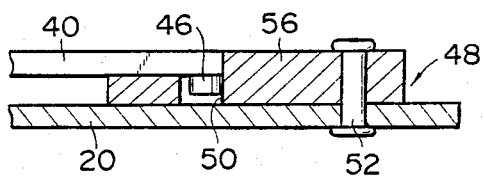
FIG. 3 is a sectional view taken along a line III—III in FIG. 2.

A straight groove 54 communicating with the groove 50 is formed on the plate cam 48 and the respective grooves 50 and 54 are formed at a side of the pin 52 with a projecting portion 56 projected in a longitudinal direction of the pin 52, as clearly shown in FIG. 3. Therefore, the forward end face of the pawl 40 is caused to abut on the projecting portion 56, whereby the wheel 36 is restricted from rotation by the pawl 40. In addition, the plate cam 48 is formed with a linear portion 58, as shown in FIG. 2, and the trigger lever 60 is disposed close to or abutting on the linear portion 58.

The trigger lever 60 causes the plate cam 48 to rotate during an emergency situation of the vehicle, one end portion of which is supported rotatably by a pin 62, the other end portion thereof being provided with a roller 64. The roller 64 acts to decrease friction when the roller 64 is caused to abut on the linear portion 58 of the plate cam 48. Also, the trigger lever 60 is provided at its lower face with a protrusion 66, a forward end thereof being caused to abut on a head 70 of an inertia pendulum 68 as an acceleration sensor.

The inertia pendulum 68 is suspended downwardly from the disc type head 70, a bottom face of the head 70 being positioned on a support plate 72.

On the other hand, connected to the trigger lever 60 is a coil spring 74 which biases the trigger lever 60 in a clockwise direction as shown in FIG. 2. Accordingly, as the protrusion 66 of the trigger lever 60 pushes the head 70 of the inertia pendulum 68 downwardly, the inertia pendulum 68 is not moved very much even though it is subjected to vibrations in the ordinary running situation of the vehicle, but in the emergency situation of the vehicle when the vehicle is stopped urgently with a high deceleration, the inertia pendulum 68 swings alot, so that the head 70 pushes up to the trigger 60 (in a counterclockwise direction). As shown in FIG. 2, when the forward end of the trigger lever 60 is pushed up over a line passing through a fulcrum of the coil spring 74 and the pin 62, the coil spring 74 biases the trigger lever 60 in a counterclockwise direction. Thus, the inertia pendulum only acts as an initiator for rotation of the trigger lever 60.

In this embodiment the trigger means comprises mainly the inertia pendulum 68 as the acceleration sensor and the trigger lever 60, and it is set of a predetermined value so as to work when an acceleration or deceleration of the vehicle reaches about 5 G or more. A combination of an electrical sensor and a solenoid may be used as another acceleration sensor mechanism, or trigger means.

In addition, the wheel 36 is connected to the takeup shaft 22 through a clutch 80 and, therefore, the wheel 36 is not connected to the takeup shaft 22 while rotation of the wheel 36 is stopped by the pawl 40, but the wheel 36 is connected to the takeup shaft 22 when it is rotated.

Description will now be given of the operation of the embodiment.

In the ordinary running situation of the vehicle, as shown in FIG. 2, the pawl 40 is latched to the recess 45 of the wheel 36, so that the wheel rotation is restricted, and the pawl 40 is maintained in its latched situation to the recess 45 by the arc-shaped groove 50 of the plate cam 48. Also, the trigger lever 60 is placed into such a position as to prevent the movement of inertia pendulum 68, such resulting from the biasing force of the coil spring 74.

Figure 4:
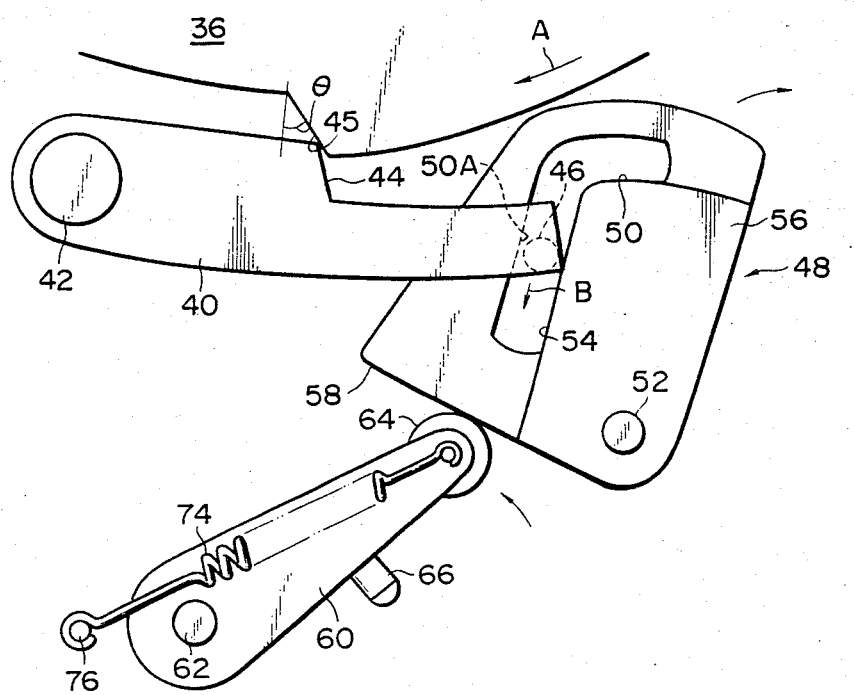
FIG. 4 is an enlarged partial view of FIG. 2 showing a working situation.

In these conditions, when the vehicle is stopped urgently with a deceleration of 5 G or more in the emergency situation thereof, the inertia pendulum 68 swings largely, so that the head 70 of the inertia pendulum 68 causes the trigger lever 60 to rotate in the counterclockwise direction against the biasing force of the coil spring 74. The trigger lever 60 pushed up by the head 70 is rotated itself because of the biasing force of the coil spring 74 and the roller 64 of the trigger lever 60 causes the plate cam 48 to rotate in the clockwise direction, as shown in FIG. 4.

The arc-shaped groove 50 of the plate cam 48 is centered around pin 52, as set forth above, and, therefore, the pawl 40 is not moved while the pin 46 of the pawl 40 is being received in the arc-shaped groove 50. When the pin 46 passes through the arc-shaped groove 50 to reach a turning point between the arc-shaped groove 50 and the straight hole 54, the pawl 40 begins to rotate in the clockwise direction. In order to release the pawl 40 from the wheel 36 more smoothly the respective latching faces of the projection 44 of the pawl 40 and the recess 45 of the wheel 36 are inclined by a predetermined angle $\theta$ to normal lines of the pawl 40 and the wheel 36, whereby, even though the respective latching faces become dusty or injured, the pawl 40 can be released from the wheel 36 smoothly.

As the wheel 36 is biased in a direction of arrow A by the large coil spring, as shown in FIG. 1, the pawl 40 is rotated in the clockwise direction. In addition thereto, the rotation of the pawl 40 is supplemented by the plate cam 48, whereby the releasing performance of the pawl 40 is enhanced. That is to say, a cam groove face 50A of the arc-shaped groove 50 abutting on the pin 46 in FIG. 4 acts so as to push the pin 46 in a direction of arrow B in accordance with the rotation of the plate cam 48.

When the wheel 36 rotates, the webbing 24 (in FIGS. 1 and 2) is retracted on to the takeup shaft 22 by a predetermined length thereof, so that a slack of the webbing 24 fastening the occupant is removed, or cancelled.

In this connection, after the webbing tension device is actuated, a locking mechanism additionally disposed in the webbing retractor 10 is actuated so that the webbing 24 is prevented from being unwound.

In the above embodiment all steps comprising the sensor actuation, the trigger actuation and the wheel rotation are conducted in about 20 m sec. as soon as an acceleration or deceleration of the vehicle reaches a predetermined value.

What is claimed is:

1. A webbing tension device adapted for use in a webbing retractor for protecting an occupant in an emergency situation of a vehicle, which comprises:
   (a) a wheel supported by a webbing takeup shaft of the webbing retractor;
   (b) first resilient means biasing the wheel in a direction of a retraction of an occupant restraining webbing;
   (c) a pawl caused to latch to a portion of the wheel, thereby preventing the wheel from its rotation;
   (d) cam means abutting on the pawl to support it, thereby maintaining a latching situation of the pawl and the wheel, the cam means allowing the pawl to be released from the wheel when the cam means is rotated in one direction;
   (e) trigger means causing the cam means to rotate in the one direction to release the pawl from the wheel in the emergency situation of the vehicle, the trigger means having a reversible structure including an acceleration sensor detecting the emergency situation of the vehicle, a trigger member opposed to the cam means and rotated by the acceleration sensor in the emergency situation of the vehicle and second resilient means biasing the trigger member, the direction of the biasing force of the second resilient means being reversed at a pedetermined rotated position of the trigger member; and
   (f) clutch means connecting the wheel to the takeup shaft to transmit a biasing force of the first resilient means to the takeup shaft when the wheel is rotated,
   whereby the pawl and the wheel are securely latched to and released from each other.

2. A webbing tension device as set forth in claim 1, wherein the cam means is rotatably supported by a support means and it is formed with a projection portion projecting in an axial direction of the support means, whereby a forward end portion of the pawl is caused to abut on the projection portion so that the pawl prevents the wheel from rotating in the ordinary running situation of the vehicle.

3. A webbing tension device as set forth in claim 2, wherein the cam means is formed with a first groove about the support means and a protrusion provided at the forward end portion of the pawl is received in the first groove, whereby the latching situation of the pawl and the wheel is maintained in the ordinary running situation of the vehicle.

4. A webbing tension device as set forth in claim 3, wherein the cam means if formed with a second groove communicating with the first groove, whereby the protrusion of the pawl is moved from the first groove to the second groove in the emergency situation of the vehicle.

5. A webbing tension device as set forth in claim 4, which further comprises a third resilient means biasing the takeup shaft in the direction of the retraction of the webbing, the biasing force of the third resilient means being weaker than that of the first resilient means, whereby the takeup shaft is always slightly biased in the direction of the retraction of the webbing so that the webbing fastened about the occupant is taut.

6. A webbing tension device as set forth in claim 5, wherein the takeup shaft is fixed at one end with one end of a rod coaxially therewith, the first resilient means is supported at one end by an intermediate portion of the rod, and the third resilient means is fixed at one end to the other end portion of the rod.

7. A webbing tension device as set forth in claim 6, wherein the pawl presses the cam means in the direction of the acceleration sensor in the ordinary running situation of the vehicle, and the cam means is rotated in the reverse direction thereto by the acceleration sensor through the trigger member in the emergency situation of the vehicle.

8. A webbing tension device as set forth in claim 7, wherein the first and third resilient means are spiral springs, the second resilient means is a coil spring and the acceleration sensor is a pendulum.

9. A webbing tension device adapted for use in a webbing retractor for protecting an occupant in an emergency situation of a vehicle, which comprises:
   (a) a wheel supported by a webbing takeup shaft, the takeup shaft being rotatably supported by a frame fixed to a vehicle body and retracting an occupant restraining webbing thereon;
   (b) first resilient means biasing the wheel in a direction that will cause the retraction of the webbing;
   (c) a pawl caused to latch to a portion of the wheel, thereby preventing the wheel from its rotation;
   (d) cam means abutting on the pawl to support it, thereby maintaining a latching situation of the pawl and the wheel, the cam means allowing the pawl to be released from the wheel when the cam means is rotated in one direction;
   (e) trigger means causing the cam means to rotate in one direction to release the pawl from the wheel in an emergency situation of the vehicle, the trigger means having a reversible structure including an acceleration sensor detecting the emergency situation of the vehicle, a trigger member opposed to the cam means and rotated by the acceleration sensor in the emergency situation of the vehicle and second resilient means biasing the trigger member, the direction of the biasing force of the second resilient means being reversed at a predetermined rotated position of the trigger member;
   (f) clutch means connecting the wheel to the takeup shaft to transmit a biasing force of the first resilient means to the takeup shaft when the wheel is rotated; and
   (g) third resilient means biasing the takeup shaft in the direction that will cause the retraction of the webbing, the biasing force of the third resilient means being weaker than that of the first resilient means, whereby the pawl and the wheel are securely latched to and released from each other.

10. A webbing tension device as set forth in claim 9, wherein the cam means is rotatably supported by a support means and it is formed with a projection portion projecting in an axial direction of the support means, whereby a forward end portion of the pawl is caused to abut on the projection portion so that the pawl prevents the wheel from rotating in the ordinary running situation of the vehicle.

11. A webbing tension device as set forth in claim 10, wherein the cam means is formed with a first groove about the support means and a protrusion provided at the forward end portion of the pawl is received in the first groove, whereby the latching situation of the pawl and the wheel is maintained in the ordinary running situation of the vehicle.

12. A webbing tension device as set forth in claim 11, wherein the cam means is formed with a second groove communicating with the first groove, whereby the protrusion of the pawl is moved from the first groove to the second groove in the emergency situation of the vehicle.

13. A webbing tension device adaped for use in a webbing retractor for protecting an occupant in an emergency situation of a vehicle, which comprises:
   (a) a frame fixed to a vehicle body;
   (b) a takeup shaft rotatably supported by the frame and retracting an occupant restraining webbing thereon;
   (c) a wheel supported by the takeup shaft;
   (d) a first spring biasing the wheel rotatively in a direction that will cause the retraction of the webbing;
   (e) a pawl caused to latch to a portion of the wheel, thereby preventing the wheel from rotating in an ordinary running situation of the vehicle;
   (f) trigger means detecting an acceleration and deceleration acting upon the vehicle to act to release the pawl from the wheel in the emergency situation of the vehicle and having a reversible structure including an acceleration sensor having a head portion and a trigger member abutting on said head portion of the acceleration sensor, the trigger member comprising a trigger lever and a second spring biasing said lever and the biasing force of the second spring to the trigger lever being reversed when the trigger lever is rotated across a predetermined position;
   (g) cam means abutting on the pawl to support it, thereby maintaining a latching situation of the pawl and the wheel in the ordinary running situation of the vehicle, the cam means being rotatively pressed on to the acceleration sensor by the first spring through the pawl in the ordinary running situation of the vehicle and in the emergency situation of the vehicle the cam means being rotated to release the pawl from the wheel by the acceleration sensor through the trigger lever; and
   (h) clutch means connecting the wheel to the takeup shaft to transmit a biasing force of the first spring to the takeup shaft when the wheel is rotated.

14. A webbing tension device as set forth in claim 13, wherein the cam means is rotatably supported by a support means and it is formed with a projection portion projecting in an axial direction of the support means, whereby a forward end portion of the pawl is caused to abut on the projection portion so that the pawl prevents the wheel from rotating in the ordinary running situation of the vehicle.

15. A webbing tension device as set forth in claim 14, wherein the cam means is formed with a first groove about the support means and a second groove communicating with the first groove, a protrusion formed at the forward end portion of the pawl is received in the first groove in the ordinary running situation of the vehicle and it is moved to the second groove in the emergency situation of the vehicle.

16. A webbing tension device as set forth in claim 15, which further comprises a third spring biasing the takeup shaft in the direction that will cause the retraction of the webbing, the biasing force of the third spring being weaker than that of the first spring, whereby the takeup shaft is always biasing slightly in the direction of the retraction of the webbing so that the webbing fastened about the occupant is taut.

* * * * *